(12) United States Patent
Yue et al.

(10) Patent No.: US 10,354,243 B2
(45) Date of Patent: Jul. 16, 2019

(54) AUTHENTICATION METHOD AND A SERVER

(71) Applicant: LENOVO (BEIJING) LIMITED, Beijing (CN)

(72) Inventors: Dongliang Yue, Beijing (CN); Jiao Wang, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 15/083,718

(22) Filed: Mar. 29, 2016

(65) Prior Publication Data
US 2017/0178106 A1    Jun. 22, 2017

(30) Foreign Application Priority Data
Dec. 21, 2015   (CN) .......................... 2015 1 0963993

(51) Int. Cl.
*G06Q 20/00*    (2012.01)
*G06Q 20/20*    (2012.01)
(Continued)

(52) U.S. Cl.
CPC ......... *G06Q 20/206* (2013.01); *G06Q 20/405* (2013.01); *G06Q 20/40145* (2013.01);
(Continued)

(58) Field of Classification Search
CPC .......... G06Q 20/40145; G06Q 20/405; G06Q 20/206; G06Q 20/20
(Continued)

(56) References Cited

U.S. PATENT DOCUMENTS

2006/0156415 A1*  7/2006  Rubinstein ............ G06F 21/445
                                                        726/27
2010/0263033 A1* 10/2010  Rangoni ............. H04L 63/0869
                                                        726/7
(Continued)

FOREIGN PATENT DOCUMENTS

CN         101770619 A      7/2010
CN         103518207 A      1/2014
(Continued)

OTHER PUBLICATIONS

Chinese Patent Office Action dated Jan. 3, 2018 re Chinese Application No. 201510963993.7 of Lenovo (Beijing) Co., Ltd.—English summary of action.
(Continued)

*Primary Examiner* — Oluseye Iwarere
(74) *Attorney, Agent, or Firm* — Patrick J. Daugherty; Daugherty & Del Zoppo Co., LPA

(57) ABSTRACT

Disclosed are authentication methods, systems and servers. Aspect processes include receiving an authentication request sent by a first terminal; determining at least a first sub authentication request and a second sub authentication request with both corresponding to the authentication request; sending the first sub authentication request to a second terminal and the second sub authentication request to a third terminal; when receiving the first verification information sent by the second terminal and the second verification information sent by the third terminal, authenticating the first verification information and the second verification information; and sending the authentication result to the first terminal; wherein the second terminal or the third terminal is the same terminal as the first terminal or is a different terminal from the first terminal.

20 Claims, 7 Drawing Sheets

(51) Int. Cl.
*G06Q 20/40* (2012.01)
*H04L 29/06* (2006.01)
(52) U.S. Cl.
CPC ............ *H04L 63/04* (2013.01); *H04L 63/083* (2013.01); *H04L 63/0861* (2013.01)
(58) Field of Classification Search
USPC ..................................................... 705/21, 24
See application file for complete search history.

(56) References Cited

U.S. PATENT DOCUMENTS

| | | | | |
|---|---|---|---|---|
| 2011/0238517 | A1* | 9/2011 | Ramalingam | G06Q 20/10 705/26.1 |
| 2012/0084203 | A1* | 4/2012 | Mehew | G06Q 20/105 705/41 |
| 2013/0198081 | A1* | 8/2013 | Royyuru | G06Q 20/322 705/44 |
| 2014/0223520 | A1* | 8/2014 | Gafni | H04L 63/107 726/4 |
| 2015/0149358 | A1* | 5/2015 | Robbin | G06Q 20/40 705/44 |
| 2015/0287028 | A1* | 10/2015 | DeLuca | G06Q 20/40145 705/44 |
| 2015/0379617 | A1* | 12/2015 | Khalsa | G06F 21/62 705/26.82 |
| 2016/0019543 | A1* | 1/2016 | Taylor | H04L 63/08 705/44 |
| 2016/0267319 | A1* | 9/2016 | Murillo | G06K 9/00255 |
| 2017/0374070 | A1* | 12/2017 | Shah | H04L 63/0884 |

FOREIGN PATENT DOCUMENTS

| | | |
|---|---|---|
| CN | 103905457 A | 7/2014 |
| CN | 104009850 A | 8/2014 |

OTHER PUBLICATIONS

Chinese Patent Office Action dated Aug. 28, 2018 re Chinese Application No. 201510963993.7 of Lenovo (Beijing) Ltd.— English translation of action.

* cited by examiner

AUTHENTICATION METHOD AND A SERVER

FIELD OF THE INVENTION

The present invention relates to an authentication technology, particularly to an authentication method and a server.

BACKGROUND

With the development of the Internet technology, electronic payments are widely used in various areas; for example, in online banking, online shopping and the like. At present, an electronic payment method is that a payment is made and completed after a server verifies the verification information entered by someone.

When an electronic device, such as a mobile phone or a computer, is used for an electronic payment, one could complete an electronic payment in an electronic device with one authentication in general. However, personal verification information is much easier to be leaked; if it is authenticated with one's verification information, the security of the authentication is lower and the safety of the payment environment is not high, the payment authentication level is also low, resulting in a final property loss.

SUMMARY

An embodiment of the present invention provides a computer-implemented authentication method, comprising executing on a processor steps that include:

in response to receiving an authentication request from a first terminal, determining at least one of a first sub authentication request and a second sub authentication request, each corresponding to the authentication request;

sending the first sub authentication request to a second terminal and the second sub authentication request to a third terminal;

in response to receiving a first verification information from the second terminal and a second verification information from the third terminal, authenticating the first verification information and the second verification information to generate an authentication result; and sending the authentication result to the first terminal. Each of the second terminal and the third terminal are one of a same terminal as the first terminal, and a different terminal from the first terminal.

Aspects of the present invention also include a server that includes:

a receiving unit that receives an authentication request sent by a first terminal;

a determining unit that determines at least a first sub authentication request and a second sub authentication request that each correspond to the authentication request;

a first sending unit that sends the first sub authentication request to a second terminal and the second sub authentication request to a third terminal;

an authentication unit that receives a first verification information sent by the second terminal and a second verification information sent by the third terminal, and authenticates the first verification information and the second verification information; and a second sending unit that sends the authentication result to the first terminal. In said aspect the second terminal or the third terminal is the same terminal as the first terminal or is a different terminal from the first terminal.

Aspects of the present invention also include a system that includes a processor in communication with a logical circuit. The system processor receives an authentication request sent by a first terminal; determines at least a first sub authentication request and a second sub authentication request that each correspond to the authentication request; sends the first sub authentication request to a second terminal and the second sub authentication request to a third terminal; receives a first verification information sent by the second terminal and a second verification information sent by the third terminal; authenticates the first verification information and the second verification information; and sends the authentication result to the first terminal. In said system aspect the second terminal or the third terminal is the same terminal as the first terminal or is a different terminal from the first terminal.

DETAILED DESCRIPTION OF THE INVENTION

To fully understand the features and technical content in the embodiments of the present invention, the following section elaborates on the fulfilled embodiments of the present invention in combination with the attached drawings; the attached drawings are only used for references but not used to restrict the embodiments of the present invention.

Figure 1:
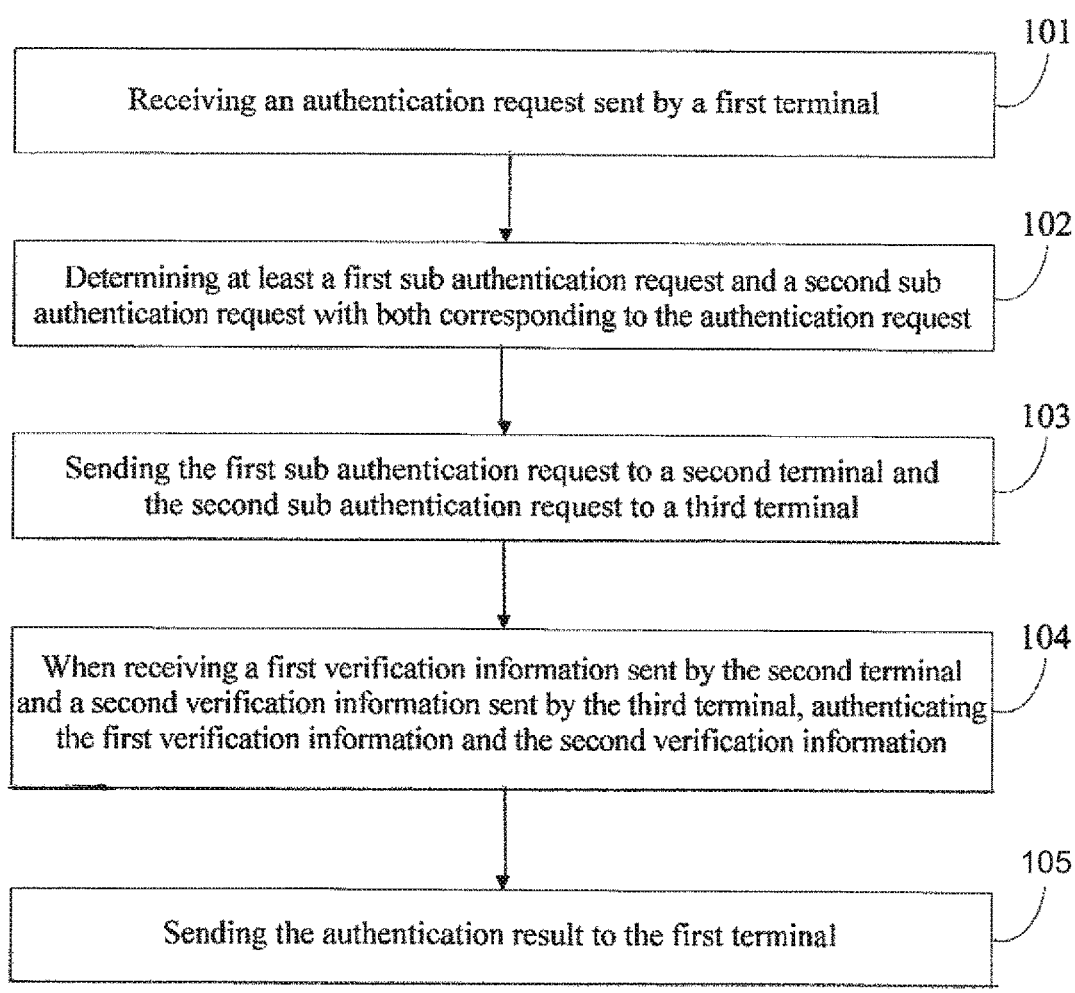
FIG. 1 is a flowchart of an authentication method according to embodiment 1 of the present invention.

FIG. 1 is a flowchart of an authentication method according to embodiment 1 of the present invention; the authentication method in the sample applies to a server side; the authentication method comprises the following steps, as shown in FIG. 1:

Step 101: receiving an authentication request sent by a first terminal.

In the embodiment of the present invention, a first terminal is bound with a bank card or an electronic wallet, and when a first user makes an electronic payment at the first terminal, the first terminal sends an authentication request for this electronic payment to the server. The server receives the authentication request sent by the first terminal.

Step 102: determining at least a first sub authentication request and a second sub authentication request with both corresponding to the authentication request;

In the embodiment of the present invention, the authentication request of an electronic payment is divided into at least two sub authentication requests. The embodiment of the present invention takes two sub authentication requests as examples to explain, and the two sub authentication requests are the first sub authentication request and the second sub authentication request respectively. Certainly, the embodiment of the present invention is not limited to two sub authentication requests; it can be three or more sub authentication requests.

Step 103: sending the first sub authentication request to a second terminal and the second sub authentication request to a third terminal;

In the embodiment of the present invention, the second terminal or the third terminal is the same terminal as the first terminal or is a different terminal from the first terminal.

In one implementation method, the second terminal is the same terminal as the first terminal, and the third terminal is a different one from the first terminal. In this implementation method, the first sub authentication request is sent to the first terminal and the second sub authentication request is sent to the third terminal. Here, the first sub authentication request is the request instructing a first user to enter the first verification information; and the second sub verification information is the request instructing a third user to enter its second verification information. Here, the user using the third terminal is the third user.

In another implementation method, the second terminal is a different terminal from the first terminal, and the third terminal is the same terminal as the first terminal. In the implementation, the first sub authentication request is sent to the second terminal and the second sub authentication request is sent to the first terminal. Here, the first sub authentication request is the request instructing a second user to enter the first verification information; and the second sub verification information is the request instructing a first user to enter its second verification information. Here, the user using the third terminal is the second user.

In another implementation method, the second terminal is a different terminal from the first terminal, and the third terminal is different from the first terminal. In this implementation, send the first sub authentication request to the second terminal and send the second sub authentication request to the third terminal. Here, the first sub authentication request is the request instructing a second user to enter the first verification information; and the second sub verification information is the request instructing a third user to enter its second verification information.

In conclusion, two different pieces of verification information of two users need to be obtained for an electronic payment authentication request. These two users can be a first user using a first terminal and a second or third user using a second or third terminal. The two users can also be a second user using a second terminal and a third user using a third terminal. The technical proposal of the embodiment of the present invention can be carried out flexibly according to the specific environment; for example, when a couple makes an electronic payment with a terminal that bonds with an additional card, it requires to obtain not only the verification information of one part entered at a first terminal, but also the verification information of the other part (main card holder) entered at a second terminal. In another scenario where a child makes an electronic payment with a terminal that bonds with an additional card, it requires to obtain not only the verification information of this child's father entered at a second terminal, but also the verification information of this child's mother entered at a third terminal.

Step 104: when receiving a first verification information sent by the second terminal and a second verification information sent by the third terminal, authenticating the first verification information and the second verification information;

In the embodiment of the present invention, after a second terminal receives the first sub authentication request, it would receive the entered first verification information, and send the first verification information to the server. Similarly, after the third terminal receives the second sub authentication request, it would receive the entered second verification information, and send the second verification information to the server. The server would authenticate the first verification information and the second verification information.

In the embodiment of the present invention, the first verification information and the second verification information are based on different payment terminals; therefore the safety level of the payment environment is quite high. Additionally, the first verification information and the second verification information could be presented in various modes, such as a password, a fingerprint, a gesture, a face and the like, further increasing the payment safety.

Step 105: sending the authentication result to the first terminal.

In the embodiment of the present invention, the authentication results are authentication success and authentication failure. For the authentication of an electronic payment, the embodiment of the present invention divides an authentication request into two sub authentication requests, and sends them to two terminals respectively, then two different users enter two different pieces of verification information respectively to authenticate at the same time, when the verification information of the two users is verified, the final authentication of this electronic payment is successful, greatly improving the authentication safety, ensuring a payment environment with a high security level, and guaranteeing users' property.

Figure 2:
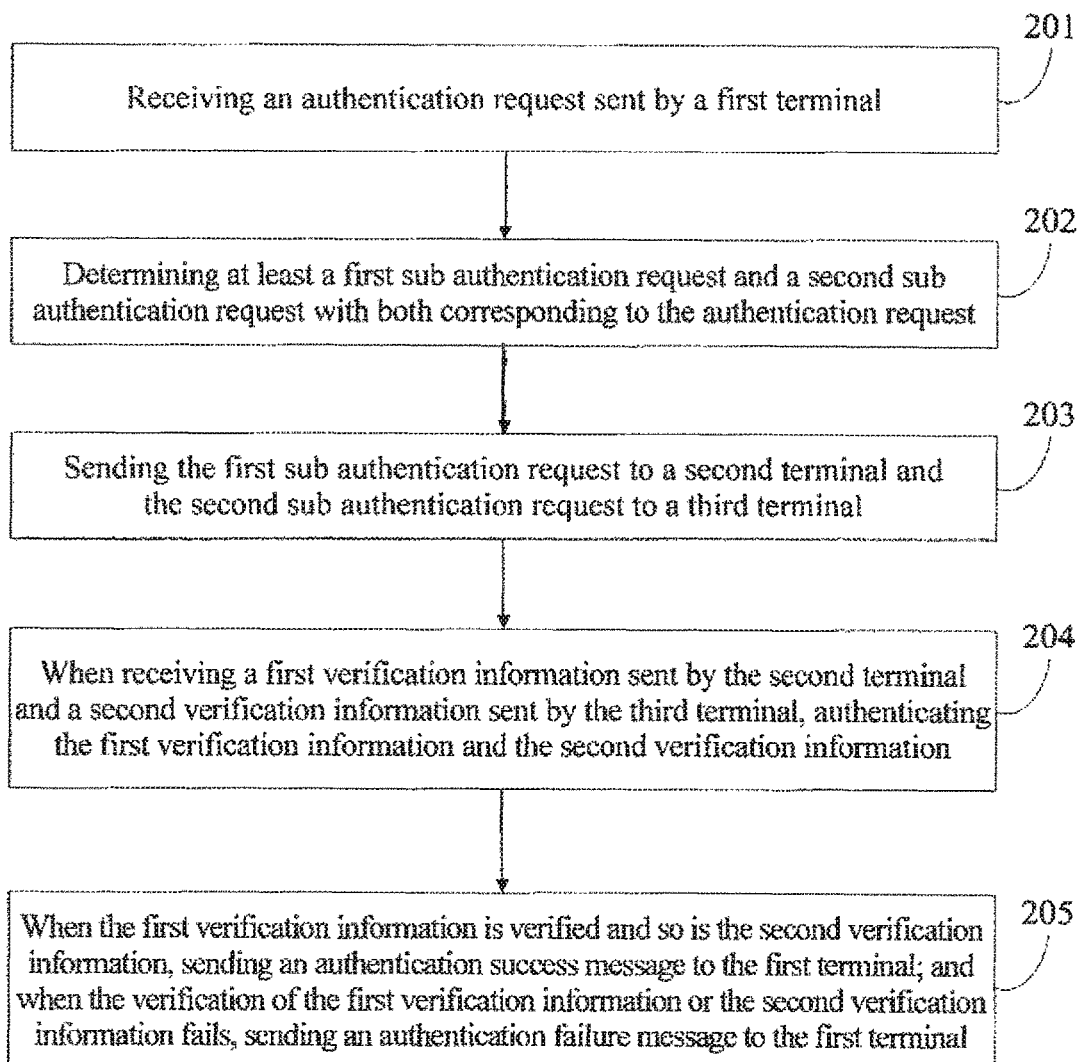
FIG. 2 is a flowchart of an authentication method according to embodiment 2 of the present invention.

FIG. 2 is a flowchart of an authentication method according to Embodiment 2 of the present invention; the authentication method in the example applies to the server side; the authentication method includes the following steps, as shown in FIG. 2:

Step 201: receiving an authentication request sent by a first terminal.

In the embodiment of the present invention, a first terminal is bound with a bank card or an electronic wallet, and when a first user makes an electronic payment at the first terminal, the first terminal sends an authentication request for this electronic payment to the server. The server receives the authentication request sent by the first terminal.

Step 202: determining at least a first sub authentication request and a second sub authentication request with both corresponding to the authentication request;

In the embodiment of the present invention, the authentication request of an electronic payment is divided into at least two sub authentication requests. The embodiment of the present invention takes two sub authentication requests as examples to explain, and the two sub authentication requests are the first sub authentication request and the second sub authentication request respectively. Certainly, the embodiment of the present invention is not limited to two sub authentication requests; it can be three or more sub authentication requests.

Step 203: sending the first sub authentication request to a second terminal and the second sub authentication request to a third terminal;

In the embodiment of the present invention, the second terminal or the third terminal is the same terminal as the first terminal or is a different terminal from the first terminal.

In one implementation method, the second terminal is the same terminal as the first terminal, and the third terminal is a different one from the first terminal. In this implementation method, the first sub authentication request is sent to the first terminal and the second sub authentication request is sent to the third terminal. Here, the first sub authentication request is the request instructing a first user to enter the first verification information; and the second sub verification information is the request instructing a third user to enter its second verification information. Here, the user using the third terminal is the third user.

In another implementation method, the second terminal is a different terminal from the first terminal, and the third terminal is the same terminal as the first terminal. In the implementation, the first sub authentication request is sent to the second terminal and the second sub authentication request is sent to the first terminal. Here, the first sub authentication request is the request instructing a second user to enter the first verification information; and the second sub verification information is the request instructing a first user to enter its second verification information. Here, the user using the second terminal is the second user.

In another implementation method, the second terminal is a different terminal from the first terminal, and the third terminal is different from the first terminal. In this implementation, send the first sub authentication request to the second terminal and send the second sub authentication request to the third terminal. Here, the first sub authentication request is the request instructing a second user to enter the first verification information; and the second sub verification information is the request instructing a third user to enter its second verification information.

In conclusion, two different pieces of verification information of two users need to be obtained for an electronic payment authentication request. These two users can be a first user using a first terminal and a second or third user using a second or third terminal. The two users can also be a second user using a second terminal and a third user using a third terminal. The technical proposal of the embodiment of the present invention can be carried out flexibly according to the specific environment; for example, when a couple makes an electronic payment with a terminal that bonds with an additional card, it requires to obtain not only the verification information of one part entered at a first terminal, but also the verification information of the other part (main card holder) entered at a second terminal. In another scenario where a child makes an electronic payment with a terminal that bonds with an additional card, it requires to obtain not only the verification information of this child's father entered at a second terminal, but also the verification information of this child's mother entered at a third terminal.

Step 204: when receiving first verification information sent by the second terminal and second verification information sent by the third terminal, authenticating the first verification information and the second verification information.

In the embodiment of the present invention, after a second terminal receives the first sub authentication request, it would receive the entered first verification information, and send the first verification information to the server. Similarly, after the third terminal receives the second sub authentication request, it would receive the entered second verification information, and send the second verification information to the server. The server would authenticate the first verification information and the second verification information.

In the embodiment of the present invention, the first verification information and the second verification information are based on different payment terminals; therefore the safety level of the payment environment is quite high. Additionally, the first verification information and the second verification information could be presented in various modes, such as a password, a fingerprint, a gesture, a face and the like, further increasing the payment safety.

Step 205: when the first verification information is verified and so is the second verification information, sending an authentication success message to the first terminal; and when the verification of the first verification information or the second verification information fails, sending an authentication failure message to the first terminal.

In the embodiment of the present invention, the authentication results are authentication success and authentication failure. When the first verification information is verified and so is the second verification information, sending an authentication success message to the first terminal. When the verification of the first verification information or the second verification information fails, sending an authentication failure message to the first terminal.

For the authentication of an electronic payment, the embodiment of the present invention divides an authentication request into two sub authentication requests, and sends them to two terminals respectively, then two different users enter two different pieces of verification information respectively to authenticate at the same time, when the verification information of the two users is verified, the final authentication of this electronic payment is successful, greatly improving the authentication safety, ensuring a payment environment with a high security level, and guaranteeing users' property.

Figure 3:
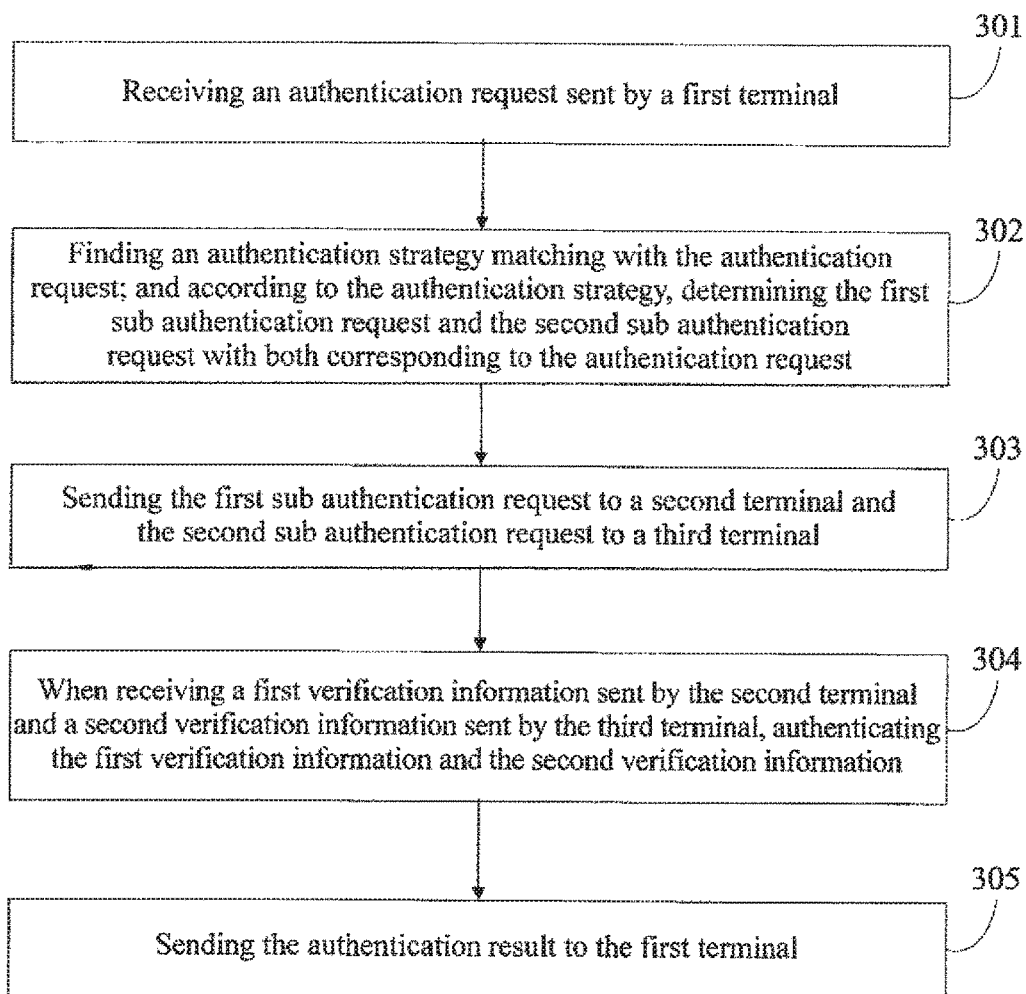
FIG. 3 is a flowchart of an authentication method according to embodiment 3 of the present invention.

FIG. 3 is a flowchart of an authentication method according to embodiment 3 of the present invention; the authentication method in this example applies to a server side; the authentication method includes the following steps, as shown in FIG. 3:

Step 301: receiving an authentication request sent by a first terminal.

In the embodiment of the present invention, a first terminal is bound with a bank card or an electronic wallet, and when a first user makes an electronic payment at the first terminal, the first terminal sends an authentication request for this electronic payment to the server. The server receives the authentication request sent by the first terminal.

Step 302: finding an authentication strategy matching with the authentication request; and according to the authentication strategy, determining the first sub authentication request and the second sub authentication request with both corresponding to the authentication request.

In the embodiment of the present invention, the authentication request of an electronic payment is divided into at least two sub authentication requests. The embodiment of the present invention takes two sub authentication requests as examples to explain, and the two sub authentication requests are the first sub authentication request and the second sub authentication request respectively. Certainly, the embodiment of the present invention is not limited to two sub authentication requests; it can be three or more sub authentication requests.

In the embodiment of the present invention, when more than two authentication strategies matching with the authentication strategies, sending a detecting message to the second and third terminals to detect the authentication method supported by the second and third terminals; receiving the response messages sent by the second and third terminals, and according to the response messages, determining the authentication method supported by the second and third terminals; based on the authentication method supported by the second and third terminals, selecting an authentication strategy from the more than two authentication strategies matching with the authentication method supported by the second and third terminals.

Here, the authentication methods supported by terminals include authentication via passwords, fingerprints, voices, faces and the like.

For example, the second terminal supports a password authentication, and the third terminal supports a fingerprint authentication; the server would determine that the first sub authentication request is to authenticate a password, and the second sub authentication request is to authenticate a fingerprint.

In the embodiment of the present invention, when more than two authentication strategies matching with the authentication request are found, selected, based on the priorities, an authentication strategy with the highest priority from the more than two authentication strategies.

For example, the authentication strategy with the highest priority is: the first sub authentication request is to authenticate through a password, and the second sub authentication request is to authenticate through a fingerprint.

Step 303: sending the first sub authentication request to a second terminal and the second sub authentication request to a third terminal;

In the embodiment of the present invention, the second terminal or the third terminal is the same terminal as the first terminal or is a different terminal from the first terminal.

In one implementation method, the second terminal is the same terminal as the first terminal, and the third terminal is a different one from the first terminal. In this implementation method, the first sub authentication request is sent to the first terminal and the second sub authentication request is sent to the third terminal. Here, the first sub authentication request is the request instructing a first user to enter the first verification information; and the second sub verification information is the request instructing a third user to enter its second verification information. Here, the user using the third terminal is the third user.

In another implementation method, the second terminal is a different terminal from the first terminal, and the third terminal is the same terminal as the first terminal. In the implementation, the first sub authentication request is sent to the second terminal and the second sub authentication request is sent to the first terminal. Here, the first sub authentication request is the request instructing a second user to enter the first verification information; and the second sub verification information is the request instructing a first user to enter its second verification information. Here, the user using the second terminal is the second user.

In another implementation method, the second terminal is a different terminal from the first terminal, and the third terminal is different from the first terminal. In this implementation, send the first sub authentication request to the second terminal and send the second sub authentication request to the third terminal. Here, the first sub authentication request is the request instructing a second user to enter the first verification information; and the second sub verification information is the request instructing a third user to enter its second verification information.

In conclusion, two different pieces of verification information of two users need to be obtained for an electronic payment authentication request. These two users can be a first user using a first terminal and a second or third user using a second or third terminal. The two users can also be a second user using a second terminal and a third user using a third terminal. The technical proposal of the embodiment of the present invention can be carried out flexibly according to the specific environment; for example, when a couple makes an electronic payment with a terminal that bonds with an additional card, it requires to obtain not only the verification information of one part entered at a first terminal, but also the verification information of the other part (main card holder) entered at a second terminal. In another scenario where a child makes an electronic payment with a terminal that bonds with an additional card, it requires to obtain not only the verification information of this child's father entered at a second terminal, but also the verification information of this child's mother entered at a third terminal.

Step 304: when receiving first verification information sent by the second terminal and second verification information sent by the third terminal, authenticating the first verification information and the second verification information.

In the embodiment of the present invention, after a second terminal receives the first sub authentication request, it would receive the entered first verification information, and send the first verification information to the server. Similarly, after the third terminal receives the second sub authentication request, it would receive the entered second verification information, and send the second verification information to the server. The server would authenticate the first verification information and the second verification information.

In the embodiment of the present invention, the first verification information and the second verification information are based on different payment terminals; therefore the safety level of the payment environment is quite high. Additionally, the first verification information and the second verification information could be presented in various modes, such as a password, a fingerprint, a gesture, a face and the like, further increasing the payment safety.

Step 305: sending the authentication result to the first terminal.

In the embodiment of the present invention, the authentication results are authentication success and authentication failure. For the authentication of an electronic payment, the embodiment of the present invention divides an authentication request into two sub authentication requests, and sends them to two terminals respectively, then two different users enter two different pieces of verification information respectively to authenticate at the same time, when the verification information of the two users is verified, the final authentication of this electronic payment is successful, greatly improving the authentication safety, ensuring a payment environment with a high security level, and guaranteeing users' property.

Figure 4:
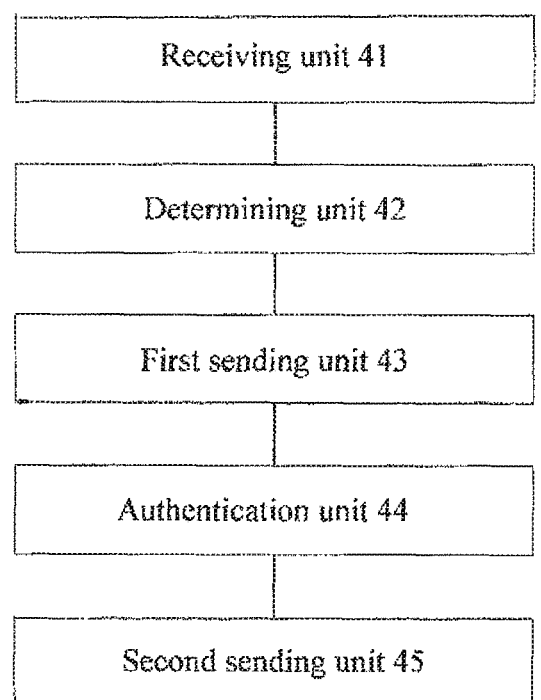
FIG. 4 is a structural composition diagram of a server according to embodiment 1 of the present invention.

FIG. 4 is a structural composition diagram of a server according to embodiment 1 of the present invention, as shown in FIG. 4, the server comprises:

a receiving unit 41, used to receive an authentication request sent by a first terminal;

a determining unit 42, used to determine at least a first sub authentication request and a second sub authentication request with both corresponding to the authentication request;

a first sending unit 43, used to send the first sub authentication request to a second terminal and the second sub authentication request to a third terminal;

an authentication unit 44, used to, when receiving a first verification information sent by the second terminal and a second verification information sent by the third terminal, authenticate the first verification information and the second verification information;

a second sending unit 45, used to send the authentication result to the first terminal;

wherein the second terminal or the third terminal is the same terminal as the first terminal or is a different terminal from the first terminal.

As those skilled in the art should understand, the realized function of each unit in the server shown in FIG. 4 can be understood with reference to the related description of the authentication method. The function of each unit in the server shown in FIG. 4 can be realized by a running program on a processor, and can be further realized by a specific logical circuit.

Figure 5:
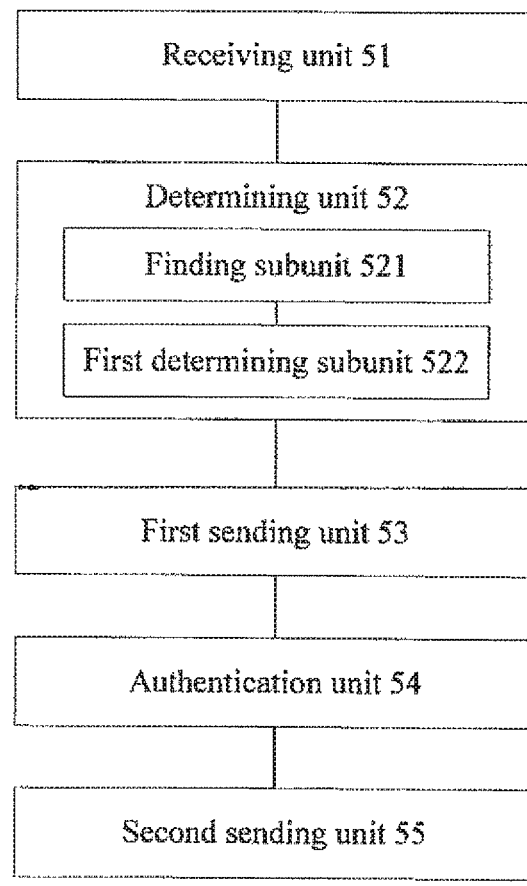
FIG. 5 is a structural composition diagram of a server according to embodiment 2 of the present invention.

FIG. 5 is a structural composition diagram of a server according to embodiment 2 of the present invention, as shown in FIG. 5, the server comprises:

a receiving unit 51, used to receive an authentication request sent by a first terminal;

a determining unit 52, used to determine at least a first sub authentication request and a second sub authentication request with both corresponding to the authentication request;

a first sending unit 53, used to send the first sub authentication request to a second terminal and the second sub authentication request to a third terminal;

an authentication unit 54, used to, when receiving a first verification information sent by the second terminal and a second verification information sent by the third terminal, authenticate the first verification information and the second verification information;

a second sending unit 55, used to send the authentication result to the first terminal;

wherein the second terminal or the third terminal is the same terminal as the first terminal or is a different terminal from the first terminal.

The second sending unit 55 is further used to send an authentication success message to the first terminal when the first verification information is verified and so is the second verification information.

The second sending unit 55 is further used to send an authentication failure message to the first terminal when the verification of the first verification information or the second verification information fails.

The determining unit 52 comprises:

a finding subunit 521, used to find an authentication strategy matching with the authentication request;

a first determining subunit 522, used to determine at least a first sub authentication request and a second sub authentication request with both corresponding to the authentication request.

As those skilled in the art should understand, the realized function of each unit in the server shown in FIG. 5 can be understood with reference to the related description of the authentication method. The function of each unit in the server shown in FIG. 5 can be realized by a running program on a processor, and can be further realized by a specific logical circuit.

Figure 6:
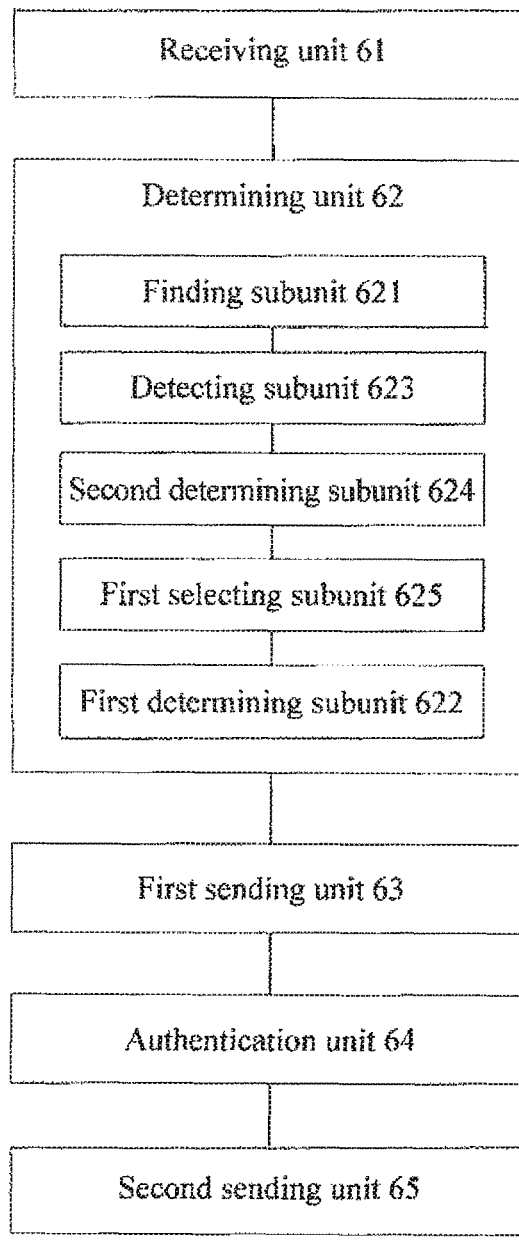
FIG. 6 is a structural composition diagram of a server according to embodiment 3 of the present invention.

FIG. 6 is a structural composition diagram of a server according to embodiment 3 of the present invention, as shown in FIG. 6, the server comprises:

a receiving unit 61, used to receive an authentication request sent by a first terminal;

a determining unit 62, used to determine at least a first sub authentication request and a second sub authentication request with both corresponding to the authentication request;

a first sending unit 63, used to send the first sub authentication request to a second terminal and the second sub authentication request to a third terminal;

an authentication unit 64, used to, when receiving a first verification information sent by the second terminal and a second verification information sent by the third terminal, authenticate the first verification information and the second verification information;

a second sending unit 65, used to send the authentication result to the first terminal;

wherein the second terminal or the third terminal is the same terminal as the first terminal or is a different terminal from the first terminal.

The second sending unit 65 is further used to send an authentication success message to the first terminal when the first verification information is verified and so is the second verification information.

The second sending unit 66 is further used to send an authentication failure message to the first terminal when the verification of the first verification information or the second verification information fails.

The determining unit 62 comprises:

a finding subunit 621, used to find an authentication strategy matching with the authentication request;

a first determining subunit 622, used to determine at least a first sub authentication request and a second sub authentication request with both corresponding to the authentication request.

The determining unit 62 further comprises:

a detecting subunit 623, used to, when more than two authentication strategies matching with the authentication request are found, send a detecting message to the second terminal and the third terminal to detect an authentication method supported by the second and third terminals;

a second determining unit 624, used to receive response messages sent by the second and third terminals, and based on the response messages, determining the authentication method supported by the second and third terminals;

a first selected sub unit 625 is further used to, based on the authentication method supported by the second and third terminals, select an authentication strategy matching with the authentication method supported by the second and third terminals.

As those skilled in the art should understand, the realized function of each unit in the server shown in FIG. 6 can be understood with reference to the related description of the authentication method. The function of each unit in the server shown in FIG. 6 can be realized by a running program on a processor, and can be further realized by a specific logical circuit.

Figure 7:
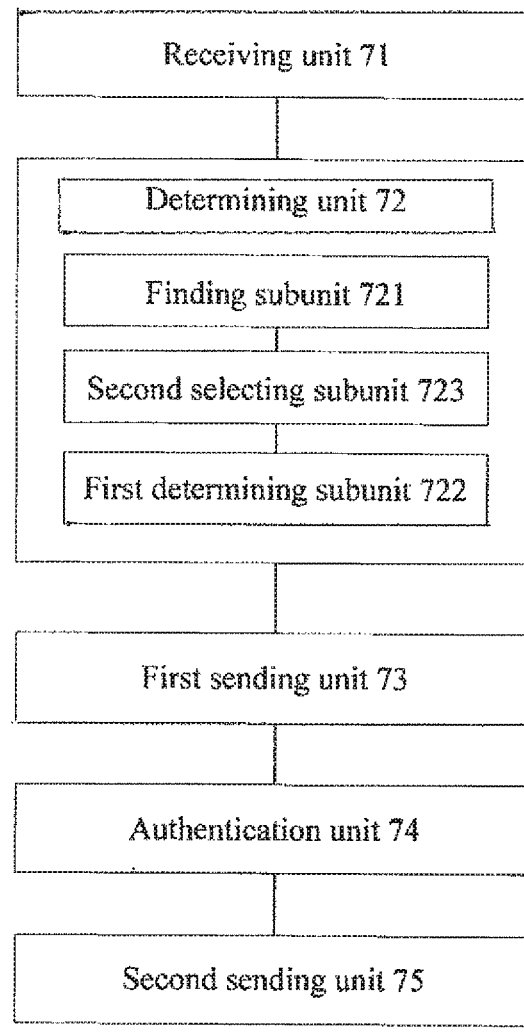
FIG. 7 is a structural composition diagram of a server according to embodiment 4 of the present invention.

FIG. 7 is a structural composition diagram of a server according to embodiment 4 of the present invention, as shown in FIG. 7, the server comprises:

a receiving unit 71, used to receive an authentication request sent by a first terminal;

a determining unit 72, used to determine at least a first sub authentication request and a second sub authentication request with both corresponding to the authentication request;

a first sending unit 73, used to send the first sub authentication request to a second terminal and the second sub authentication request to a third terminal;

an authentication unit 74, used to, when receiving a first verification information sent by the second terminal and a second verification information sent by the third terminal, authenticate the first verification information and the second verification information;

a second sending unit 75, used to send the authentication result to the first terminal;
wherein the second terminal or the third terminal is the same terminal as the first terminal or is a different terminal from the first terminal.

The second sending unit 75 is further used to send an authentication success message to the first terminal when the first verification information is verified and so is the second verification information.

The second sending unit 76 is further used to send an authentication failure message to the first terminal when the verification of the first verification information or the second verification information fails.

The determining unit 72 comprises:
a finding subunit 721, used to find an authentication strategy matching with the authentication request;
a first determining subunit 722, used to determine at least a first sub authentication request and a second sub authentication request with both corresponding to the authentication request.

The determining unit 72 further comprises:
a second selected sub unit 723, wherein when more than two authentication strategies matching with the authentication request are found, the second selecting subunit is used to select, based on the priorities, an authentication strategy with the highest priority from the more than two authentication strategies.

As those skilled in the art should understand, the realized function of each unit in the server shown in FIG. 7 can be understood with reference to the related description of the authentication method. The function of each unit in the server shown in FIG. 7 can be realized by a running program on a processor, and can be further realized by a specific logical circuit.

The technical solutions in the embodiments of the present invention can be combined randomly in the case of no conflicts.

In a plurality of embodiments provided herein, it should be understood that the realizations of the disclosed method and the intelligent appliance by other means are possible. The appliance embodiments of the present invention is only schematic, in other words, the units are categorized depending on the logic function or in other application methods, for example: a plurality of units or components can be combined or integrated into another system, or certain characteristics can be omitted or not exercised. Additionally, coupling, direct coupling, or communication connections among the component parts as shown or discussed may be implemented through some interface(s), and indirect coupling or communication connections of devices or units may be in an electrical, mechanical, or other forms.

The units described above as separate components may be or may not be separated physically. The components illustrated as units may be or may not be physical units, which can be located in one place, and also can be distributed to a plurality of network units; the object of the present solution of the embodiment can be achieved by some or all of the units, according to actual requirements.

In addition, all functional units in the embodiments of the present invention can be fully integrated into a second processing unit, or each functional unit is separately used as a unit or two or more units are integrated into one unit; moreover, the integrated unit can be realized in the hardware manner or in the manner of hardware plus software functional unit.

The above are only some particular implementations of the present disclosure, and the protection scope of the present disclosure is not limited thereto. Variations or alterations that are within the technical scope as disclosed in the present disclosure and may be readily conceived by those skilled in the art fall within the protection scope of the present disclosure.

What is claimed is:

1. An online authentication method, comprising the steps of:
in response to receiving an electronic payment authentication request from a first terminal over a network, determining at least one of a first sub authentication request and a second sub authentication request that is different from the first sub authentication request, each of the first sub authentication request and the second sub authentication request corresponding to the electronic payment authentication request;
sending the first sub authentication request to a second terminal over the network and the second sub authentication request to a third terminal over the network;
in response to receiving a first verification information provided by a first user from the second terminal over the network and a second verification information provided by a second user that is different from the first user from the third terminal over the network, authenticating the first verification information, and authenticating the second verification information;
generating a payment authentication result as a function of the authentication of the first verification information and the authentication of the second verification information;
sending the generated authentication result to the first terminal over the network;
wherein the second terminal is different from the third terminal;
wherein each of the first sub authentication request and the second sub authentication include a different authentication method sent to each corresponding terminal over the network, wherein the different authentication method is selected from the group consisting of a password, a fingerprint, a voice, and a face.

2. The method according to claim 1, wherein the step of sending of the generated authentication result to the first terminal over the network is responsive to verifying both of the first verification information and the second verification information.

3. The method according to claim 1, further comprising:
sending an authentication failure message to the first terminal over the network in response to at least one of the steps of authenticating the first verification information and authenticating the second verification information failing.

4. The method according to claim 1, further comprising:
matching an authentication strategy to the electronic payment authentication request; and
determining the at least one of the first sub authentication request and the second sub authentication request as a function of the matching authentication strategy.

5. The method according to claim 4, further comprising:
in response to matching a plurality of different authentication strategies to the electronic payment authentication request, sending at least one detecting message to the second terminal and to the third terminal over the network;
receiving response messages from the second and the third terminals over the network in response to the sent at least one detecting message;

determining authentication methods supported by the respective ones of the second and the third terminals as a function of the response messages received from the second and the third terminals over the network; and
selecting authentication strategies for respective ones of the second and the third terminals from the plurality of authentication strategies that each match the authentication methods determined as supported by the respective ones of the second and the third terminals.

6. The method according to claim 4, further comprising:
in response to matching a plurality of different authentication strategies to the payment authentication request, selecting for respective ones of the second and the third terminals an authentication strategy with a highest priority relative to priorities of others of the plurality of matching, different authentication strategies.

7. The method of claim 1, wherein the different network comprises the Internet.

8. A server, comprising:
a receiving unit that receives an electronic payment authentication request sent by a first terminal over a network;
a determining unit that determines at least a first sub authentication request and a second sub authentication request that is different from the first sub authentication request, wherein each of the first sub authentication request and the second authentication request corresponds to the electronic payment authentication request;
a first sending unit that sends the first sub authentication request to a second terminal over the network and the second sub authentication request to a third terminal over the network;
an authentication unit that receives a first verification information provided by a first user and sent by the second terminal over the network and a second verification information provided by a second user that is different from the first user and sent by the third terminal over the network, authenticates the first verification information, authenticates the second verification information, and generates a payment authentication result as a function of the authentication of the first verification information and the authentication of the second verification information;
a second sending unit that sends the generated authentication result to the first terminal over the network;
wherein the second terminal is different from the third terminal; and
wherein each of the first sub authentication request and the second sub authentication include a different authentication method sent to each corresponding terminal over the network, wherein the different authentication method is selected from the group consisting of a password, a fingerprint, a voice, and a face.

9. The server according to claim 8, wherein the second sending unit sends an authentication success message to the first terminal over the network in response to verification of the first verification information and the second verification information.

10. The server according to claim 8, wherein the second sending unit sends an authentication failure message to the first terminal over the network in response to failure of the first verification information or of the second verification information.

11. The server according to claim 8, wherein the determining unit further comprises:
a finding subunit that finds an authentication strategy matching to the electronic payment authentication request; and
a first determining subunit that determines at least first and second sub authentication requests that both correspond to the electronic payment authentication request.

12. The server according to claim 11, wherein the determining unit further comprises:
a detecting subunit that, in response to matching a plurality of different authentication strategies to the payment authentication request, sends at least one detecting message to the second terminal and to the third terminal over the network;
a second determining subunit that determines authentication methods supported by the second and third terminals in response to messages sent over the network by the second and third terminals in response to the at least one detecting message; and
a first selecting subunit that selects authentication strategies for respective ones of the second and the third terminals from the plurality of authentication strategies that each match the authentication methods determined as supported by the respective ones of the second and the third terminals.

13. The server according to claim 11, wherein the determining unit further comprises:
a second selecting subunit that selects for respective ones of the second and the third terminals an authentication strategy with a highest priority relative to priorities of others of the plurality of matching, different authentication strategies.

14. The server according to claim 8, wherein the network comprises the Internet.

15. A system, comprising:
a processor in communication with a logical circuit;
wherein the processor:
receives an electronic payment authentication request sent by a first terminal over a network;
determines at least a first sub authentication request and a second sub authentication request that is different from the first sub authentication request, wherein each of the first sub authentication request and the second sub authentication corresponds to the electronic payment authentication request;
sends the first sub authentication request to a second terminal over the network and the second sub authentication request to a third terminal over the network;
receives first verification information provided by a first user and sent by the second terminal over the network and second verification information provided by a second user and sent by the third terminal network;
authenticates the first verification information and authenticates the second verification information, and generates an authentication result as a function of authenticating the first verification information and authenticating the second verification information;
sends the generated authentication result to the first terminal over the network;
wherein the second terminal is different from the third terminal; and
wherein each of the first sub authentication request and the second sub authentication include a different authentication method sent to each corresponding terminal over the network, wherein the different authentication method is selected from the group consisting of a password, a fingerprint, a voice, and a face.

16. The system according to claim 15, wherein the processor sends an authentication success message to the first terminal over the network in response to verification of the first verification information and the second verification information.

17. The system according to claim 15, wherein the processor sends an authentication failure message to the first terminal over the network in response to failure of the first verification information or of the second verification information.

18. The system according to claim 15, wherein the processor:
    finds an authentication strategy matching to the electronic payment authentication request; and
    determines at least first and second sub authentication requests that both correspond to the electronic payment authentication request.

19. The system according to claim 15, wherein the processor:
    in response to matching a plurality of different authentication strategies to the electronic payment authentication request, sends at least one detecting message over the network to the second terminal and to the third terminal;
    determines authentication methods supported by the second and third terminals in response to messages sent by the second and third terminals in response to the at least one detecting message; and
    selects authentication strategies for respective ones of the second and the third terminals from the plurality of authentication strategies that each match the authentication methods determined as supported by the respective ones of the second and the third terminals.

20. The system according to claim 15, wherein the processor selects for respective ones of the second and the third terminals an authentication strategy with a highest priority relative to priorities of others of the plurality of matching, different authentication strategies.

* * * * *